(12) United States Patent
Johnston et al.

(10) Patent No.: US 10,427,491 B2
(45) Date of Patent: Oct. 1, 2019

(54) THERMAL MANAGEMENT SYSTEM WITH HEAT EXCHANGER BLENDING VALVE

(75) Inventors: Vincent George Johnston, Half Moon Bay, CA (US); Curt Raymond O'Donnell, Sunnyvale, CA (US); Wulfer Adrijan de Bruijn, Redwood City, CA (US); Marco Elkenkamp, San Francisco, CA (US)

(73) Assignee: TESLA, INC., Palo Alto, CA (US)

( * ) Notice: Subject to any disclaimer, the term of this patent is extended or adjusted under 35 U.S.C. 154(b) by 994 days.

(21) Appl. No.: 13/459,112

(22) Filed: Apr. 28, 2012

(65) Prior Publication Data

US 2013/0074525 A1    Mar. 28, 2013

Related U.S. Application Data

(60) Provisional application No. 61/539,997, filed on Sep. 28, 2011.

(51) Int. Cl.
| | |
|---|---|
| *F25B 49/00* | (2006.01) |
| *F25D 3/00* | (2006.01) |
| *F25D 31/00* | (2006.01) |
| *B60H 1/00* | (2006.01) |
| *B60H 1/14* | (2006.01) |
| *B60H 1/32* | (2006.01) |

(52) U.S. Cl.
CPC ..... *B60H 1/00278* (2013.01); *B60H 1/00385* (2013.01); *B60H 1/143* (2013.01); *B60H 1/323* (2013.01); *B60H 2001/00307* (2013.01)

(58) Field of Classification Search
CPC ............ B60H 1/00278; B60H 1/00385; B60H 1/323; B60H 1/143; B60H 2001/00307; B60H 2001/00928; B60H 1/00885; H01M 6/5038
See application file for complete search history.

(56) References Cited

U.S. PATENT DOCUMENTS

| | | |
|---|---|---|
| 3,985,110 A | 10/1976 | Doundoulakis |
| 5,035,115 A | 7/1991 | Ptasinski |
| 5,058,391 A | 10/1991 | Periot |
| 5,291,960 A | 3/1994 | Brandenburg et al. |
| 5,339,776 A | 8/1994 | Regueiro |
| 5,483,807 A | 1/1996 | Abersfelder et al. |
| 5,537,956 A | 7/1996 | Rennfeld et al. |
| 5,542,387 A | 8/1996 | Okubo |
| 5,584,360 A | 12/1996 | Wedeven |
| 5,604,441 A | 2/1997 | Freese et al. |
| 5,647,534 A | 7/1997 | Kelz et al. |

(Continued)

FOREIGN PATENT DOCUMENTS

| | | | |
|---|---|---|---|
| DE | 19930148 A1 * | 1/2000 | ......... B60H 1/00278 |
| DE | 19930148 A1 | 1/2000 | |

*Primary Examiner* — Frantz F Jules
*Assistant Examiner* — Martha Tadesse
(74) *Attorney, Agent, or Firm* — Garlick & Markison; Bruce Garlick

(57) ABSTRACT

A thermal management system and method of use are provided, the system including a heat exchanger, a refrigeration system, a coolant loop thermally coupled to the heat exchanger, and a by-pass valve that regulates the amount of coolant within the coolant loop that either passes through the heat exchanger or is diverted away from the heat exchanger. The coolant loop is thermally coupled to the battery pack of an electric vehicle.

15 Claims, 6 Drawing Sheets

(56) References Cited

U.S. PATENT DOCUMENTS

| | | | | |
|---|---|---|---|---|
| 5,669,335 | A | 9/1997 | Hollis | |
| 5,680,833 | A | 10/1997 | Smith | |
| 5,705,742 | A | 1/1998 | Fox et al. | |
| 5,992,481 | A | 11/1999 | Smith | |
| 6,124,644 | A | 9/2000 | Olson et al. | |
| 6,138,466 | A * | 10/2000 | Lake | B60H 1/00278 62/199 |
| 6,186,254 | B1 | 2/2001 | Mufford et al. | |
| 6,209,331 | B1 | 4/2001 | Lake et al. | |
| 6,213,233 | B1 | 4/2001 | Sonntag et al. | |
| 6,216,646 | B1 | 4/2001 | Smith et al. | |
| 6,305,345 | B1 | 10/2001 | Bakhtine | |
| 6,347,528 | B1 | 2/2002 | Iritani et al. | |
| 6,357,541 | B1 | 3/2002 | Matsuda et al. | |
| 6,360,835 | B1 | 3/2002 | Skala | |
| 6,394,207 | B1 | 5/2002 | Skala | |
| 6,448,535 | B1 | 9/2002 | Ap | |
| 6,464,027 | B1 | 10/2002 | Dage | |
| 6,467,286 | B2 | 10/2002 | Hasebe et al. | |
| 6,481,230 | B2 | 11/2002 | Kimishima et al. | |
| 6,561,155 | B1 | 5/2003 | Williams | |
| 6,569,550 | B2 | 5/2003 | Khelifa | |
| 6,575,258 | B1 | 6/2003 | Clemmer | |
| 6,651,761 | B1 | 11/2003 | Hrovat et al. | |
| 6,708,513 | B2 | 3/2004 | Koehler et al. | |
| 6,743,539 | B2 | 6/2004 | Clingerman et al. | |
| 6,772,603 | B2 | 8/2004 | Hsu et al. | |
| 6,797,421 | B2 | 9/2004 | Assarabowski et al. | |
| 7,048,044 | B2 | 5/2006 | Ban et al. | |
| 7,104,347 | B2 | 9/2006 | Severinsky et al. | |
| 7,147,071 | B2 | 12/2006 | Gering et al. | |
| 7,150,159 | B1 | 12/2006 | Brummett et al. | |
| 7,191,858 | B2 | 3/2007 | Vanderwees et al. | |
| 7,237,634 | B2 | 7/2007 | Severinsky et al. | |
| 7,259,469 | B2 | 8/2007 | Brummett et al. | |
| 7,591,143 | B2 | 9/2009 | Zeigler et al. | |
| 7,591,303 | B2 | 9/2009 | Zeigler et al. | |
| 7,797,954 | B2 * | 9/2010 | Duhme | B60H 1/00278 62/184 |
| 2002/0027027 | A1 | 3/2002 | Skala | |
| 2002/0040896 | A1 | 4/2002 | Ap | |
| 2003/0193009 | A1 | 10/2003 | Dill | |
| 2003/0217876 | A1 | 11/2003 | Severinsky et al. | |
| 2005/0115748 | A1 | 6/2005 | Lanier | |
| 2005/0133215 | A1 | 6/2005 | Ziehr et al. | |
| 2005/0167169 | A1 * | 8/2005 | Gering | B60H 1/00278 237/12.3 B |
| 2005/0241865 | A1 | 11/2005 | Varenne | |
| 2006/0100057 | A1 | 5/2006 | Severinsky et al. | |
| 2006/0231305 | A1 | 10/2006 | Severinsky et al. | |
| 2007/0157647 | A1 * | 7/2007 | Duhme | B60H 1/00278 62/196.4 |
| 2008/0048457 | A1 | 2/2008 | Patel et al. | |
| 2008/0251235 | A1 * | 10/2008 | Zhou | B60H 1/00278 165/41 |
| 2008/0295535 | A1 * | 12/2008 | Robinet | B60H 1/00278 62/259.2 |
| 2009/0024256 | A1 | 1/2009 | Adams et al. | |
| 2009/0139781 | A1 | 6/2009 | Straubel | |
| 2009/0227194 | A1 | 9/2009 | Johnston | |
| 2009/0249807 | A1 * | 10/2009 | Nemesh | B60H 1/00278 62/117 |
| 2009/0280395 | A1 | 11/2009 | Nemesh et al. | |
| 2009/0317697 | A1 * | 12/2009 | Dogariu | B60H 1/00278 429/62 |
| 2010/0012295 | A1 * | 1/2010 | Nemesh | B60H 1/00278 165/104.19 |
| 2012/0225341 | A1 * | 9/2012 | Major | B60H 1/00278 429/120 |

* cited by examiner

THERMAL MANAGEMENT SYSTEM WITH HEAT EXCHANGER BLENDING VALVE

CROSS-REFERENCE TO RELATED APPLICATION

This application claims the benefit of the filing date of U.S. Provisional Patent Application Ser. No. 61/539,997, filed 28 Sep. 2011, the disclosure of which is incorporated herein by reference for any and all purposes.

FIELD OF THE INVENTION

The present invention relates generally to thermal control systems and, more particularly, to a system for controlling the level of heat rejection from the coolant fluid in a vehicle cooling system to the refrigerant of a refrigeration system in the coolant-to-refrigerant heat exchanger of a vehicle thermal management system.

BACKGROUND OF THE INVENTION

The thermal management system of an automobile typically utilizes multiple cooling loops, thus providing the desired level of flexibility needed to regulate the temperatures of multiple vehicle subsystems. System complexity may be dramatically increased if the vehicle utilizes an electric or hybrid drive train due to the need to regulate the temperature of the vehicle's battery pack.

FIG. 1 is a high level diagram that illustrates the basic subsystems within the thermal management system 100 of a typical electric vehicle. In general, the thermal management system of such a vehicle includes a refrigeration subsystem 101, a passenger cabin HVAC subsystem 103, and a battery cooling/heating subsystem 105. In an alternate configuration illustrated in FIG. 2, the thermal management system 200 also includes a drive train cooling subsystem 201. Thermal management systems 100 and 200 also include a controller 109. Controller 109 may be a dedicated thermal management system controller, or may utilize the vehicle control system in order to reduce manufacturing cost and overall vehicle complexity.

Refrigeration subsystem 101 is designed to be thermally coupled via one or more heat exchangers to the other thermal subsystems comprising systems 100/200 whenever it is necessary or desirable to reduce the temperature in the thermally-coupled subsystem. As such, in a conventional system the heat exchanger used to couple the refrigeration subsystem 101 to the other thermal subsystems is sized to insure sufficient cooling capacity under maximum thermal loading conditions, i.e., the conditions in which the coolant temperature of the other cooling subsystem(s) is at the highest expected temperature and thermal dissipation requirements are set to the highest possible level. Generally, however, the thermal management system will not be required to provide this level of thermal dissipation. As a result, heat will be extracted from the coolant at a rate much greater than that being input into the coolant by the devices being cooled, leading to a rapid cooling of the coolant and large swings in coolant temperatures between coolant and components, and most importantly large swings in the amount of refrigerant cooling capacity used in reaction to the coolant temperature inside the heat exchanger. In order to avoid such temperature and cooling capacity swings, a conventional thermal management system may regulate the coolant flow rate through the heat exchanger by regulating the coolant pump speed. Alternately, a conventional thermal management system may rely on the self-regulating aspects of the refrigerant thermal expansion valve based on the fixed super-heat setting.

While the conventional approaches of controlling the thermal dissipation provided by the refrigeration system are adequate for many applications, an improved system for controlling thermal loads and thermal dissipation levels is desired. The present invention provides such a thermal management system.

SUMMARY OF THE INVENTION

The present invention provides a thermal management system for use in a vehicle (e.g., an electric vehicle), the system comprising a heat exchanger, a refrigeration system thermally coupled to the heat exchanger, and a coolant loop thermally coupled to the vehicle's battery pack and thermally coupled to the heat exchanger via heat exchanger inlet and outlet ports, where the coolant within the coolant loop is cooled via the heat exchanger and the refrigeration system. The system further comprises a by-pass valve that regulates coolant flow through the heat exchanger, where the by-pass valve is coupled to the coolant loop between the heat exchanger inlet and outlet ports such that the by-pass valve operates in parallel with the heat exchanger. The by-pass valve allows a first portion of the coolant entering the valve to flow through the heat exchanger while a second portion is diverted around the heat exchanger (i.e., by-passes the heat exchanger) and is then recombined with the first portion after the first portion exits the heat exchanger.

In other aspects of the invention: (i) the refrigeration system may be comprised of a gas-phase refrigerant compression system that includes a refrigerant, a refrigerant compressor, a condenser, and at least one thermal expansion valve; (ii) the refrigeration system may be coupled to the heat exchanger via the thermal expansion valve; (iii) the refrigeration system may be thermally coupled to a HVAC subsystem, for example using a cabin evaporator and a second thermal expansion valve; (iv) the thermal management system may include a controller and at least one coolant temperature detector, for example mounted to monitor the temperature of the coolant exiting the heat exchanger, where the controller regulates coolant flow through the heat exchanger using the by-pass valve based on the monitored coolant temperature; (v) the thermal management system may include a controller and at least one temperature detector for monitoring battery pack temperature, where the controller regulates coolant flow through the heat exchanger using the by-pass valve based on the monitored battery pack temperature; (vi) the refrigeration system may be thermally coupled to a HVAC subsystem, for example using a cabin evaporator, the thermal management system further including a controller and at least one coolant temperature detector and at least one HVAC evaporator outlet temperature detector, where the controller regulates coolant flow through the heat exchanger using the by-pass valve based on the monitored coolant temperature and HVAC evaporator air outlet temperature; (vii) the circulation pump used to circulate coolant through the coolant loop may be configured to operate in only two modes, where the first mode does not circulate coolant (i.e., the "off" mode) and the second mode circulates coolant at a constant flow rate; (viii) the speed of the circulation pump used to circulate coolant through the coolant loop may be modulated, for example using pulse width modulation; (ix) the thermal management system may include a heater coupled to the coolant loop, for example thermally coupled to the coolant loop between the heat exchanger and the battery pack; and (x) the coolant loop may include a coolant reservoir.

In another aspect of the invention, a method of continuously regulating thermal dissipation of a vehicle battery pack is provided, the method including the steps of (a) monitoring the temperature of the coolant within a coolant loop, where the coolant loop is coupled to and in thermal communication with a vehicle battery pack and a heat exchanger, where the heat exchanger is in thermal communication with a refrigeration system, where the coolant is chilled as it passes through the heat exchanger by the refrigeration system, and where a by-pass valve coupled to the coolant loop splits the coolant entering the by-pass valve into a first portion that flows through the heat exchanger and a second portion that is diverted around the heat exchanger and recombined with the first portion after the first portion exits the heat exchanger; (b) comparing the coolant temperature to a preset temperature; (c) increasing the first coolant portion and decreasing the second coolant portion if the coolant temperature is greater than the preset temperature; and (d) decreasing the first coolant portion and increasing the second coolant portion if the coolant temperature is less than the preset temperature. Steps (a) through (d) are preferably performed repeatedly as long as the vehicle is operating. Step (a) may further be comprised of the step of monitoring coolant temperature of the first coolant portion after the first coolant portion exits the heat exchanger but before it is recombined with the second coolant portion.

In another aspect, the preset temperature corresponds to a preset range of temperatures and the method further comprises the step of neither increasing nor decreasing either the first or second coolant portions if the coolant temperature is within the preset range of temperatures.

In another aspect, the evaporator outlet temperature of the HVAC subsystem coupled to the refrigeration system is monitored, and step (c) of the method further comprises the steps of (c1) comparing a first HVAC evaporator air outlet temperature determined before performing step c) with a second HVAC evaporator air outlet temperature determined after performing step c), and (c2) decreasing the first coolant portion and increasing the second coolant portion if the second HVAC evaporator air outlet temperature deviates from the first HVAC evaporator air outlet temperature by more than a preset amount, where step (c2) is performed until the first and second HVAC evaporator air outlet temperatures do not deviate by more than the preset amount.

In another aspect, passenger cabin temperature is monitored and compared to a user input HVAC setting, and adjusting the HVAC system in response to the passenger cabin temperature and the user input HVAC setting.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery, battery pack, capacitor or supercapacitor. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
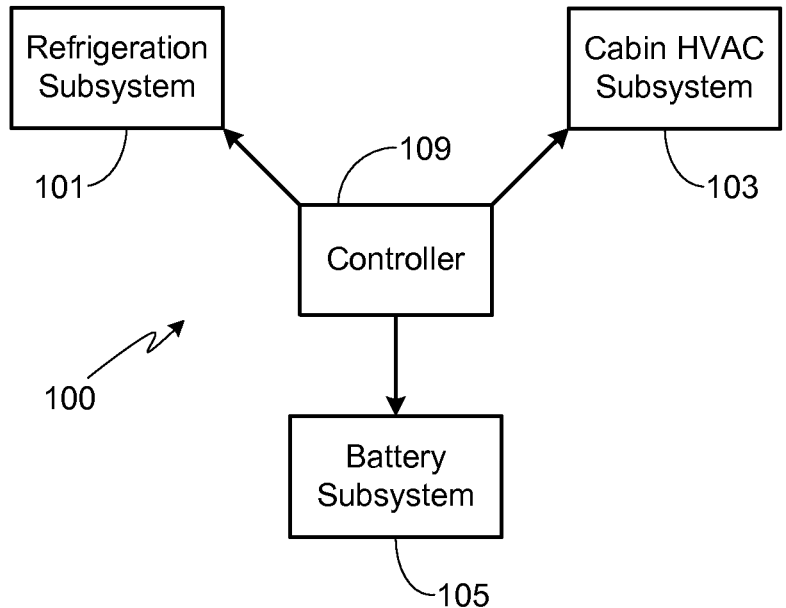
FIG. 1 provides a high level diagram of the various subsystems used in the thermal management system of a typical electric vehicle.
Figure 2:
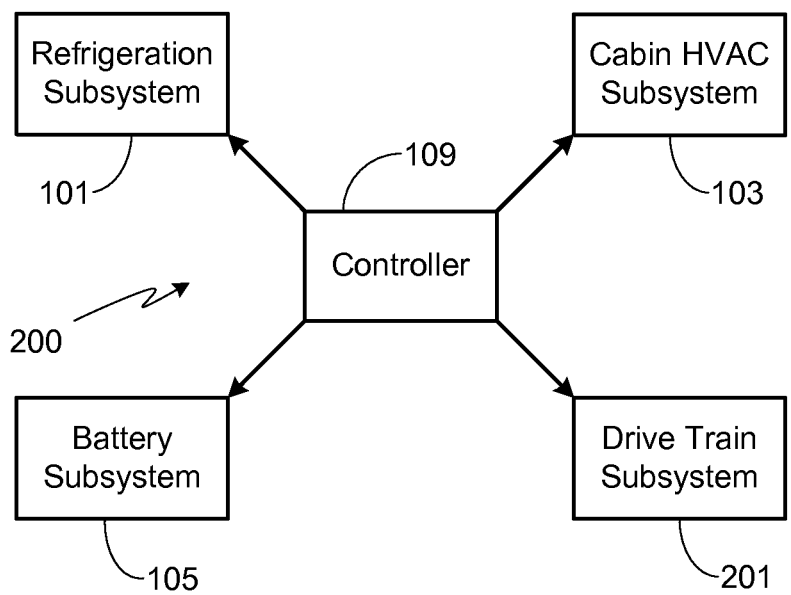
FIG. 2 provides a high level diagram of the various subsystems used in an alternate thermal management system for use in an electric vehicle.
Figure 3:
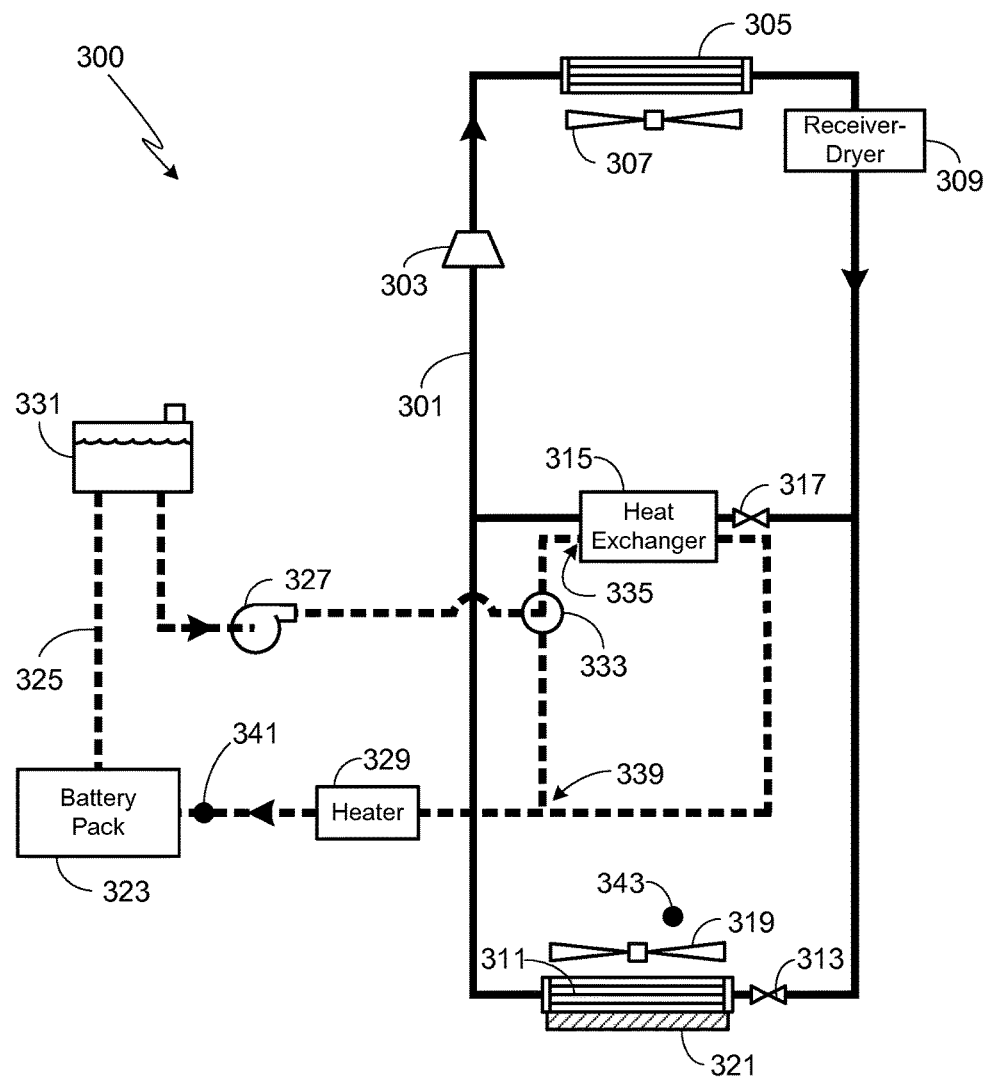
FIG. 3 illustrates a preferred embodiment of the architecture of a thermal management system utilizing the by-pass valve of the current invention.

FIG. 3 illustrates the components associated with an exemplary thermal management system 300 that utilizes the present invention. It should be understood that the invention may be used with other architectures/configurations.

The refrigeration subsystem shown in FIG. 3 uses a gas-phase refrigerant compression system although it will be appreciated that other means (e.g., a thermo-electric cooler) may be used to cool the refrigerated side of the heat exchanger used in conjunction with the battery cooling subsystem. In the illustrated system, the refrigerant (e.g., R134a) is maintained within refrigeration conduit 301. A compressor 303 compresses the low temperature refrigerant vapor in the subsystem into a high temperature vapor. The refrigerant vapor then dissipates a portion of the captured heat when it passes through condenser 305, thereby leading to a phase change from vapor to liquid, where the remaining liquid is at a temperature below the saturation temperature at the prevailing pressure. Preferably the performance of condenser 305 is enhanced by using a blower fan 307. The liquid phase refrigerant then passes through a receiver-dryer 309 that removes moisture from the condensed refrigerant. In the preferred embodiment, and as shown, refrigerant line 301 is coupled to a cabin evaporator 311 via a thermal expansion valve 313, and to a heat exchanger 315 (also referred to herein as a chiller) via a thermal expansion valve 317. Thermal expansion valves 313 and 317 control the flow rate of refrigerant into evaporator 311 and chiller 315, respectively.

The heating, ventilation and cooling (HVAC) subsystem (i.e., subsystem 103) provides temperature control for the vehicle's passenger cabin, typically via a plurality of ducts and vents. Preferably the HVAC subsystem includes one or more fans 319 that are used to circulate air throughout the cabin on demand, regardless of whether the air is heated, cooled, or simply fresh air from outside the vehicle. To provide cool air, refrigerant is circulated through evaporator 311. To provide warm air during normal vehicle operation, the HVAC subsystem may utilize a heater 321, for example an electric heater (e.g., a PTC heater) integrated within evaporator 311. Although not shown, the HVAC subsystem may include means such as a heat exchanger for transferring thermal energy from either drive train subsystem 201 or battery subsystem 105 to the HVAC subsystem.

The battery cooling subsystem (e.g., subsystem 105) includes a battery pack 323 coupled to a coolant loop 325 containing a coolant (i.e., a heat transfer medium such as water). In a typical electric vehicle, battery pack 323 is comprised of a plurality of batteries. One or more circulation pumps 327 pump the coolant through battery pack 323. Circulation pump 327 may utilize a simple on/off operation (i.e., two operational modes), or be varied, for example using pulse width modulation to achieve a range of pump speeds. Heat may be transferred from the battery pack to the coolant via a heat transfer plate, one or more coolant conduits, or other means that are in thermal communication with the batteries within the pack. The coolant contained in loop 325 is cooled via heat transfer with the refrigerant in heat exchanger 315, assuming that the thermostatic valve 317 allows refrigerant from the refrigeration subsystem to pass through heat exchanger 315. Additionally, in a preferred embodiment of the invention, cooling loop 325 is also thermally coupled to a heater 329 (e.g., a PTC heater), thus insuring that the temperature of the batteries within battery pack 323 can be maintained within the preferred operating range regardless of the ambient temperature.

In the illustrated embodiment, cooling loop 325 also includes a coolant reservoir 331. Cooling loop 325 may also include a radiator (not shown) for discharging heat to the ambient atmosphere.

Although not shown in FIG. 3, as previously noted the thermal management system may be configured to cool various components of the drive train such as the electric motor, and/or cool high heat load electronic components such as the power electronics, inverter and/or charger. These components may be integrated within the battery cooling loop 325 or utilize a dedicated cooling subsystem.

In accordance with the present invention, a by-pass valve 333 is included in cooling loop 325. Valve 333 is located upstream of coolant inlet port 335 of heat exchanger 315, and therefore is placed in parallel with the heat exchanger 315 as shown. As a result of this configuration, the amount of coolant that passes through heat exchanger 315 versus by-passing the heat exchanger can be regulated. In the preferred and illustrated configuration, the coolant that by-passes the heat exchanger is recombined with the chilled coolant exiting the heat exchanger at a junction 339. This approach provides control of coolant side heat rejection to the refrigerant system and allows a fixed coolant temperature to be maintained in response to current thermal load conditions which, in the preferred embodiment, depend on vehicle operating conditions (e.g., battery pack temperature, ambient temperature, etc.).

It will be appreciated that there are numerous techniques that may be used by the control system (e.g., controller 109) to control operation of by-pass valve 333 as well as the other aspects and components of the thermal management system of the invention. In general, the control system uses a plurality of temperature sensors to monitor the temperature within the various vehicle components (e.g., battery pack 323), within one or more regions of the coolant loop(s) (e.g., coolant loop 325), and within one or more locations within the passenger cabin. In response to the monitored temperatures and the desired temperature range for the battery pack, cabin and other vehicle components, the amount of coolant passing through heat exchanger 315 is regulated as is operation of the blower fans (e.g., fans 305 and 319), the heaters (e.g., heaters 321 and 329) and any other controllable features of the thermal system. While operation of the thermal control system may be manually controlled, in the preferred embodiment controller 109 operates automatically based on programming implemented by a processor, either a dedicated processor or a processor utilized in another vehicle management system.

Figure 4:
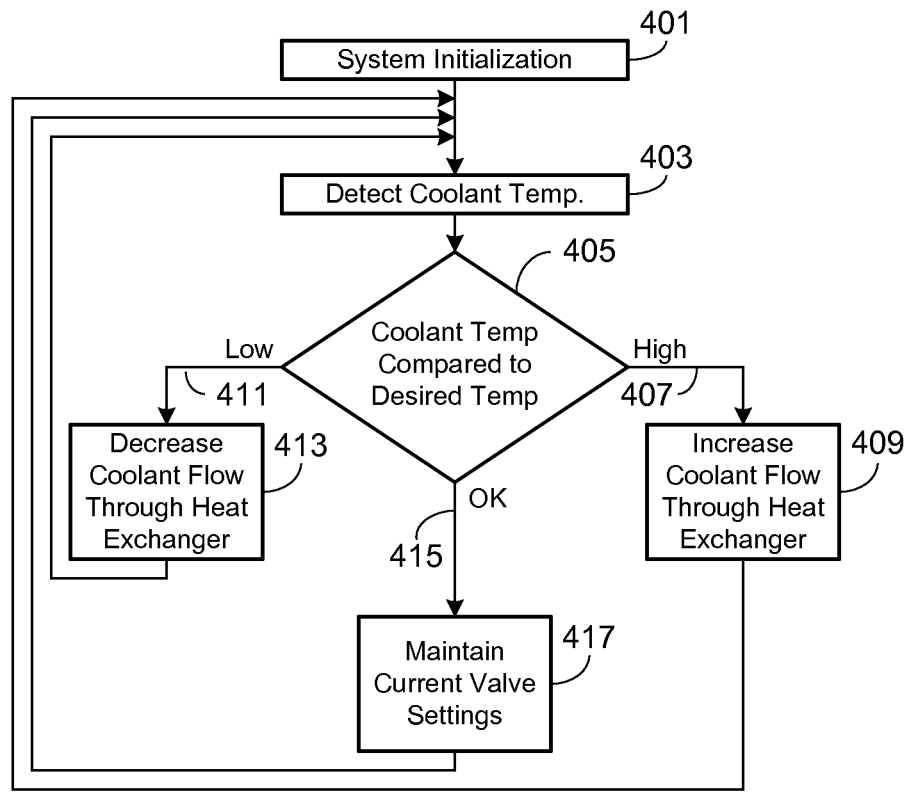
FIG. 4 illustrates an exemplary feedback control process for use with the coolant by-pass valve of the invention.

FIG. 4 illustrates an exemplary feedback control process for use with by-pass valve 333. In the illustrated process, upon system initialization (step 401) the temperature of the coolant is determined (step 403) using one or more temperature sensors 341. In the preferred embodiment temperature sensor 341 monitors the temperature of the coolant after heat exchanger 315 and before battery pack 323. It should be understood, however, that other temperatures may be used in the feedback process. For example, the temperature of the coolant exiting the battery pack 323 may be monitored or the temperature of the battery pack, or batteries within the pack, may be monitored directly. Additionally it will be appreciated that multiple temperature sensors may be used, either to provide redundancy or to allow temperature averaging.

Once the temperature has been determined, it is compared to a preset temperature or temperature range (step 405). Typically the preset temperature is set by the manufacturer although in some configurations other parties such as a third party service representative may be allowed to set this temperature/temperature range. If the detected temperature is too high relative to the preset temperature/temperature range (step 407), then by-pass valve is opened further (step 409), thus passing more coolant through heat exchanger 315 so that it may be cooled. If the detected temperature is too low relative to the preset temperature/temperature range (step 411), then by-pass valve is closed further (step 413), thus diverting more coolant away from heat exchanger 315. If the detected temperature matches the preset temperature or is within the preset temperature range (step 415), then no adjustment is made to the by-pass valve setting (step 417). This feedback process continues throughout system operation.

Figure 5:
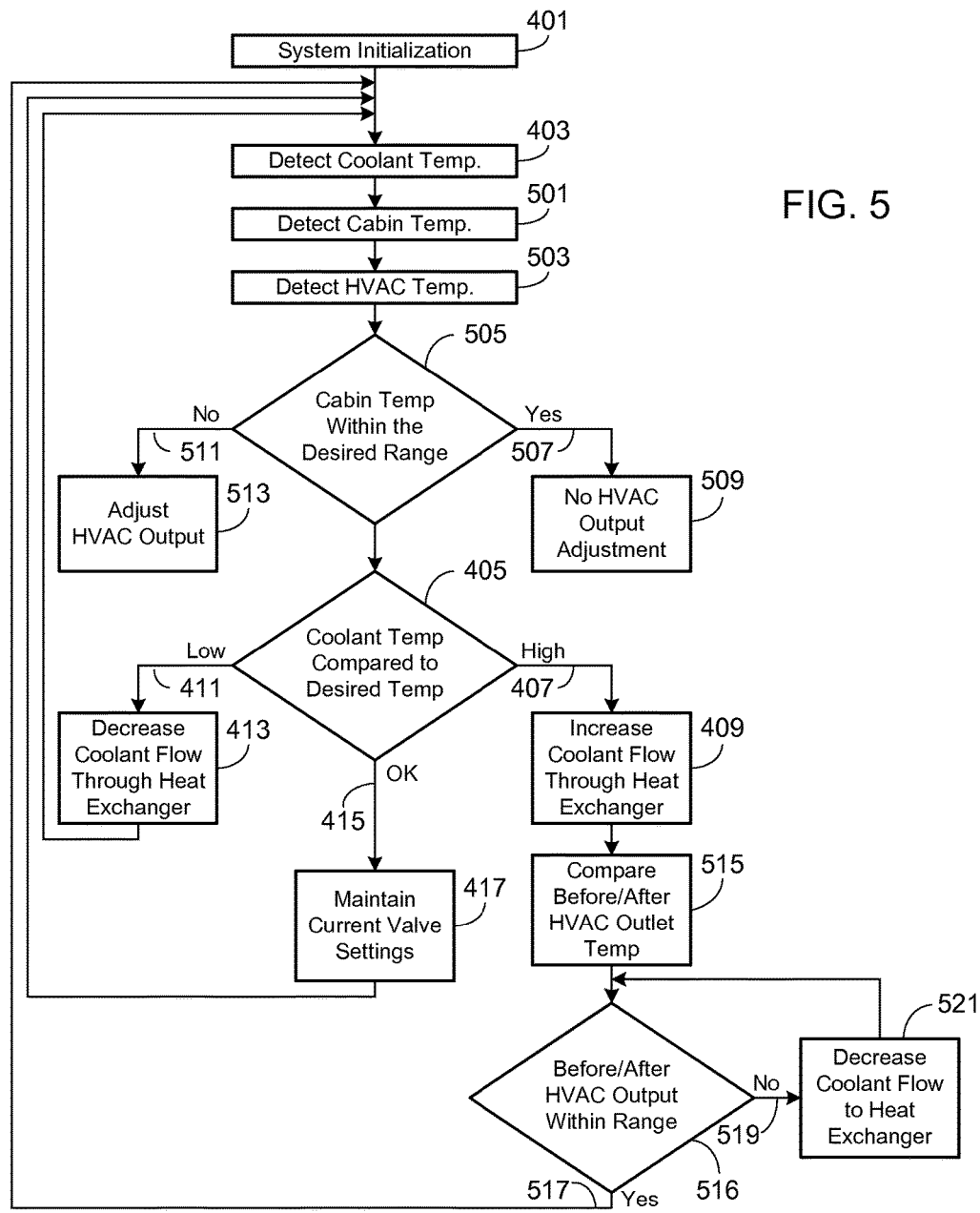
FIG. 5 illustrates an alternate feedback control process for use with the coolant by-pass valve of the invention.

In an alternate process illustrated in FIG. 5, in addition to monitoring heat load levels, for example by monitoring the temperature of the coolant or the battery pack, the system also monitors the temperature within the passenger cabin, thus allowing temperature swings within the passenger cabin to be minimized even as the heat load levels applied to the heat exchanger vary due to varying by-pass valve settings. This is especially important during the onset of battery cooling. In this embodiment, in addition to monitoring coolant temperature (step 403) the system also monitors cabin temperature (step 501), for example using a cabin temperature sensor 343, and HVAC evaporator air outlet temperature (step 503). The cabin temperature is compared to the desired cabin temperature (step 505) where the desired cabin temperature may be input by a user by adjusting a cabin temperature setting or by adjusting a HVAC control setting (e.g., to increase/decrease cabin cooling). If the cabin temperature is acceptable (step 507) then the system does not adjust HVAC output (step 509). If the cabin temperature is not acceptable (step 511) then the system does adjust HVAC output (step 513). Similar to the previously described embodiment, the system also compares coolant temperature (or battery pack temperature, etc.) to the desired temperature/temperature range (step 405). If the detected temperature is too low relative to the preset temperature/temperature range (step 411), then by-pass valve 333 is closed further (step 413), thus allowing more coolant to by-pass heat exchanger 315. If the detected temperature matches the preset temperature or is within the preset temperature range (step 415), then no adjustment is made to the by-pass valve setting (step 417). If the detected temperature is too high relative to the preset temperature/temperature range (step 407), then by-pass valve 333 is opened further (step 409), thus allowing more coolant to flow through heat exchanger 315. After increasing coolant flow to heat exchanger 315, the HVAC evaporator air outlet temperature of the HVAC system is compared to the HVAC evaporator air outlet temperature before valve 333 was adjusted (step 515). If the outlet temperature before and after by-pass valve adjustment is within a preset acceptable range (e.g., 3° C.), then the system simply continues to monitor the temperatures of the coolant, cabin, etc. (step 517). If the outlet temperature before and after by-pass valve adjustment is not within the preset range (step 519), then the coolant flow from the by-pass valve to the heat exchanger is decreased by a preset amount (step 521) and the before/after HVAC evaporator air outlet temperature is once again checked (step 516).

Figure 6:
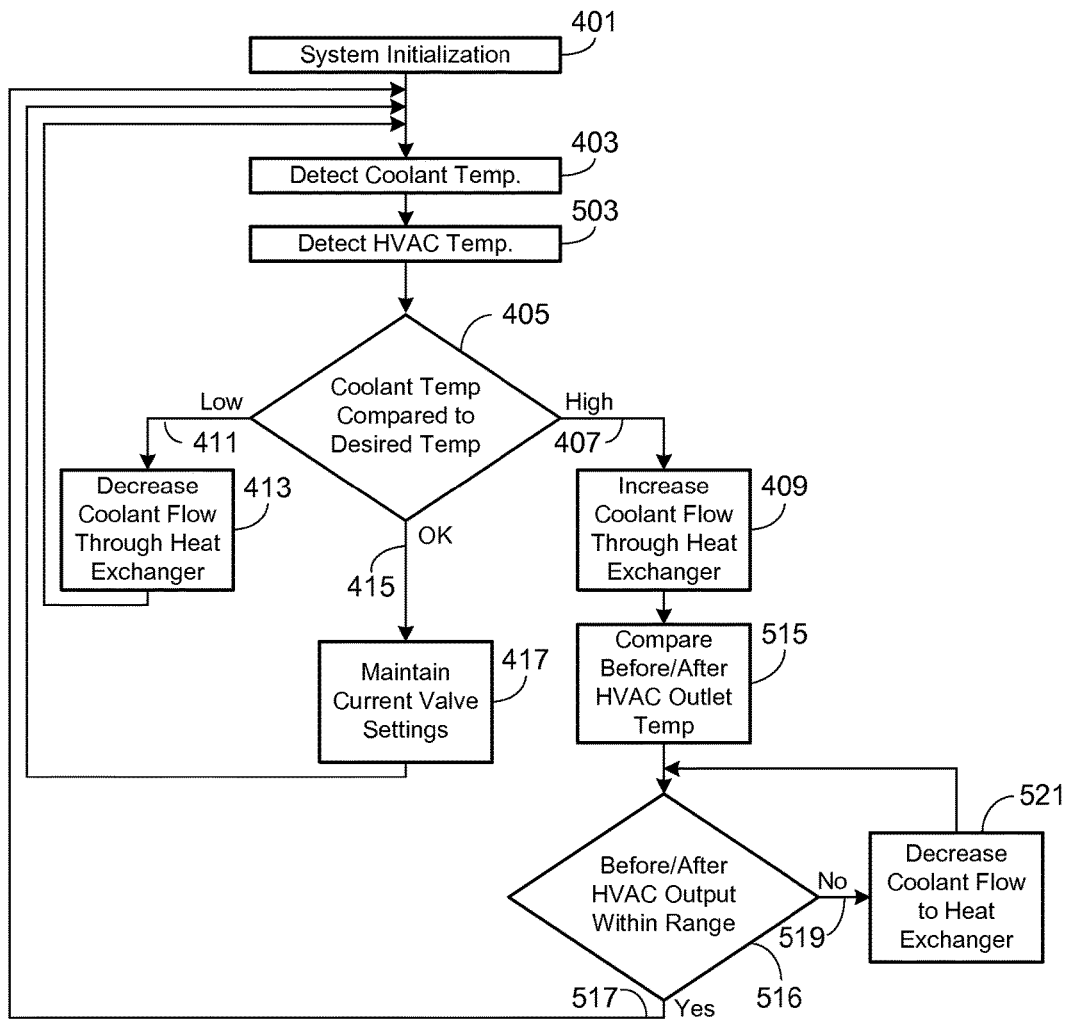
FIG. 6 illustrates an alternate feedback control process for use with the coolant by-pass valve of the invention.

FIG. 6 illustrates the process of FIG. 5, modified for use with a HVAC system in which the user, instead of setting the cabin temperature and allowing the HVAC system to self-regulate, simply adjusts the output of the HVAC system. In this relatively common configuration, the user sets HVAC output by adjusting both blower fan speed and the relative temperature of the HVAC output (i.e., in the range of "hot" to "cold"). Accordingly, in this configuration it is unnecessary to monitor cabin temperature (i.e., step 501) and use that temperature to automatically adjust HVAC output (i.e., steps 505-513). As these steps are skipped, in the process illustrated in FIG. 6 after system initialization the system compares coolant temperature (or battery pack temperature, etc.) to the desired temperature/temperature range (step 405). If the detected temperature is too low relative to the preset temperature/temperature range (step 411), then by-pass valve 333 is closed by an additional amount (step 413), thus allowing more coolant to by-pass heat exchanger 315. If the detected temperature matches the preset temperature or is within the preset temperature range (step 415), then no adjustment is made to the by-pass valve setting (step 417). If the detected temperature is too high relative to the preset temperature/temperature range (step 407), then by-pass valve 333 is opened by an additional amount (step 409), thus allowing more coolant to flow through heat exchanger 315. As in the process illustrated in FIG. 5, after increasing coolant flow to heat exchanger 315, the HVAC evaporator air outlet temperature is compared to the HVAC evaporator air outlet temperature before valve 333 was adjusted (step 515). If the outlet temperature before and after by-pass valve adjustment is within a preset acceptable range (e.g., 3° C.), then the system simply continues to monitor coolant temperatures (step 517). If the outlet temperature before and after by-pass valve adjustment is not within the preset range (step 519), then the coolant flow from the by-pass valve to the heat exchanger is decreased (step 521) and the before/after HVAC evaporator air outlet temperature is once again checked (step 516).

While preferred feedback loops for operating by-pass valve 333 have been described, it will be appreciated that other processes may be applied during the utilization of valve 333.

Figure 7:
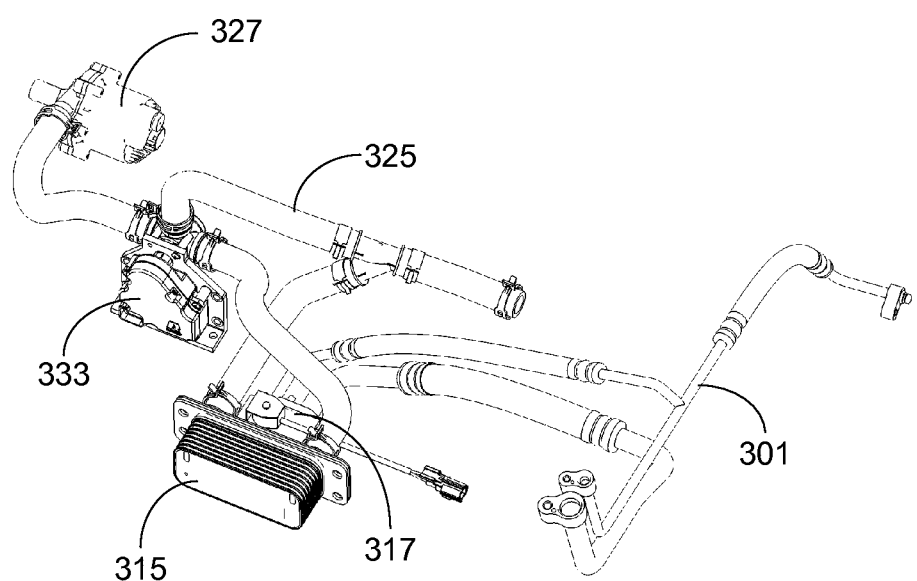
FIG. 7 provides a perspective view of some of the components of a cooling system in accordance with the invention.

FIG. 7 provides a perspective view of some of the components of a preferred cooling system in accordance with the invention as described above.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A method of regulating thermal dissipation of a battery pack of a vehicle, the vehicle including a coolant loop coupled to and in thermal communication with the battery pack and a heat exchanger, a refrigeration system coupled to and in thermal communication with the heat exchanger and an evaporator, a coolant within the coolant loop, and a by-pass valve coupled to the coolant loop to regulate a first amount of the coolant that flows through the heat exchanger and a second amount of the coolant that is diverted around the heat exchanger, the method comprising:

determining a first temperature corresponding to the coolant;

comparing the first temperature to a first preset temperature range;

adjusting the by-pass valve at a first time based on comparing the first temperature to the first preset temperature range;

comparing a second temperature corresponding to an evaporator air outlet temperature before adjusting the by-pass valve at the first time to a third temperature corresponding to the evaporator air outlet temperature after adjusting the by-pass valve at the first time; and adjusting the by-pass valve at a second time after the first time to decrease the first amount of the coolant that flows through the heat exchanger and increase the second amount of the coolant that is diverted around the heat exchanger if the second temperature and third temperature are not within a preset range.

2. The method of claim 1, further comprising monitoring a vehicle cabin temperature and adjusting an HVAC output based on the vehicle cabin temperature.

3. The method of claim 1, wherein monitoring a vehicle cabin temperature uses a cabin temperature sensor.

4. The method of claim 1, further comprising the step of comparing a fourth temperature corresponding to the evaporator air outlet temperature before adjusting the by-pass valve at the second time to a fifth temperature corresponding to the evaporator air outlet temperature after adjusting the by-pass valve at the second time.

5. The method of claim 1, wherein the refrigeration system is comprised of a gas-phase refrigerant compression system including a refrigerant, a refrigerant compressor, a condenser, and at least one thermal expansion valve.

6. The method of claim 1, wherein the step of determining the first temperature corresponding to the coolant, occurs after the coolant exists the heat exchanger and before the battery pack.

7. The method of claim 1, wherein a heater is thermally coupled to the coolant loop between the heat exchanger and the battery pack.

8. The method of claim 1, wherein the coolant loop further comprises a coolant reservoir.

9. A thermal management system comprising:
a coolant loop coupled to and in thermal communication with a battery pack and a heat exchanger;
a refrigeration system coupled to and in thermal communication with the heat exchanger and an evaporator;
a coolant with the coolant loop;
a by-pass valve coupled to the coolant loop to regulate a first amount of the coolant that flows through the heat exchanger and a second amount of the coolant that is diverted around the heat exchanger;
a temperature sensor; and
a controller operable to:
determine a first temperature corresponding to the coolant using the temperature sensor;
compare the first temperature to a first preset temperature range;
adjust the by-pass valve at a first time based on the first temperature and the first preset temperature range;
compare a second temperature corresponding to an evaporator air outlet temperature before the first time to a third temperature corresponding to the evaporator air outlet temperature after the first time; and
adjust the by-pass valve at a second time after the first time to decrease the first amount of the coolant that flows through the heat exchanger and increase the second amount of the coolant that is diverted around the heat exchanger if the second temperature and third temperature are not within a preset range.

10. The thermal management system of claim 9, further comprising a cabin temperature sensor and wherein the controller is further operable to monitor a vehicle cabin temperature using the cabin temperature sensor and adjust an HVAC output based on the vehicle cabin temperature.

11. The thermal management system of claim 9, wherein the controller is further operable to compare a fourth temperature corresponding to the evaporator air outlet temperature before the second time to a fifth temperature corresponding to the evaporator air outlet temperature after the second time.

12. The thermal management system of claim 9, wherein the refrigeration system is comprised of a gas-phase refrigerant compression system including a refrigerant, a refrigerant compressor, a condenser, and at least one thermal expansion valve.

13. The thermal management system of claim 9, wherein the temperature sensor is located after the heat exchanger and before the battery pack.

14. The thermal management system of claim 9, wherein a heater is thermally coupled to the coolant loop between the heat exchanger and the battery pack.

15. The thermal management system of claim 9, wherein the coolant loop further comprises a coolant reservoir.

* * * * *